Dec. 4, 1956 C. GERST 2,772,582
TRANSMISSION
Filed April 1, 1954 3 Sheets-Sheet 1

INVENTOR.
CHRIS GERST
BY
ATT

Dec. 4, 1956  C. GERST  2,772,582
TRANSMISSION

Filed April 1, 1954  3 Sheets-Sheet 3

INVENTOR.
CHRIS GERST
BY
Gustav A. Wolff
ATT.

United States Patent Office 2,772,582
Patented Dec. 4, 1956

2,772,582

TRANSMISSION

Chris Gerst, Detroit, Mich., assignor to The Transmission & Gear Company, Dearborn, Mich., a corporation of Michigan Application April 1, 1954, Serial No. 420,269

7 Claims. (Cl. 74—740)

This invention relates to reduction transmission mechanism and is particularly directed to improvements in reduction transmission mechanism for tractors, heavy road machinery, etc.

The primary object of the invention is the provision of a compact, reversing, multi-speed reduction transmission mechanism which embodies input and output shaft means coupled with each other by combining planetary reversing gearing and multi-speed gearing, which gearings cooperate and are adapted to effect a rotation of the output shaft at various forward and reverse speeds.

Another object of the invention is the provision of a compact, reversing, multi-speed reduction transmission mechanism which embodies an input shaft, reversing planetary gearing coupled with the input shaft, shiftable, multi-speed gearing including a countershaft coupled with the reversing planetary gearing and a main driven shaft, and output shaft means in the form of two output shafts, one of which is the said main driven shaft of the multi-speed gearing and the other one of which is arranged parallel to the main driven shaft and releasably geared thereto to permit selective rotation of such other output shaft by the main driven shaft of the multi-speed gearing.

Further objects and novel features of construction, combination and relation of parts by which the objects in view have been attained will appear and are set forth in detail in the course of the following specification. The drawings accompanying and forming part of the specification illustrate a certain practical embodiment of the invention, but it will be apparent as the specification proceeds that the structure may be modified and changed in various ways without departure from the true spirit and broad scope of the invention.

Figure 1:
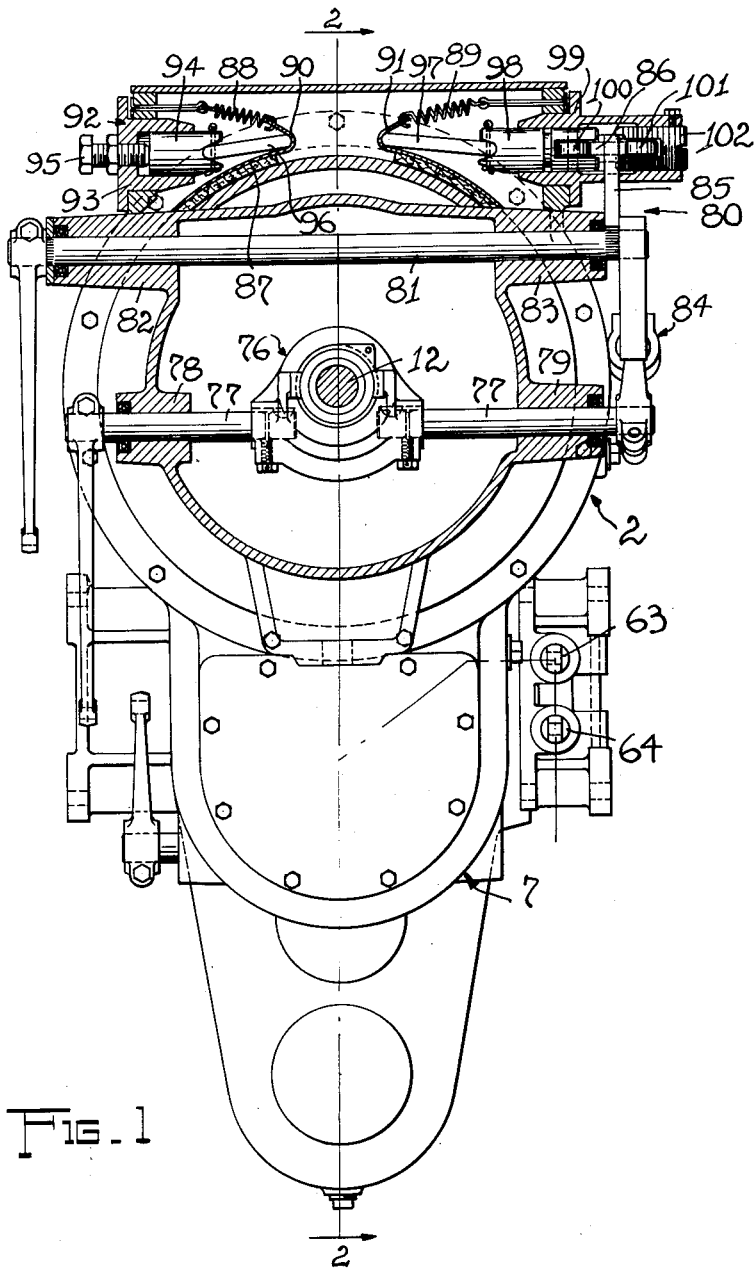
Fig. 1 is an end view, partly in section, of a reversing multi-speed reduction transmission mechanism constructed in accordance with the invention.
Figure 2:
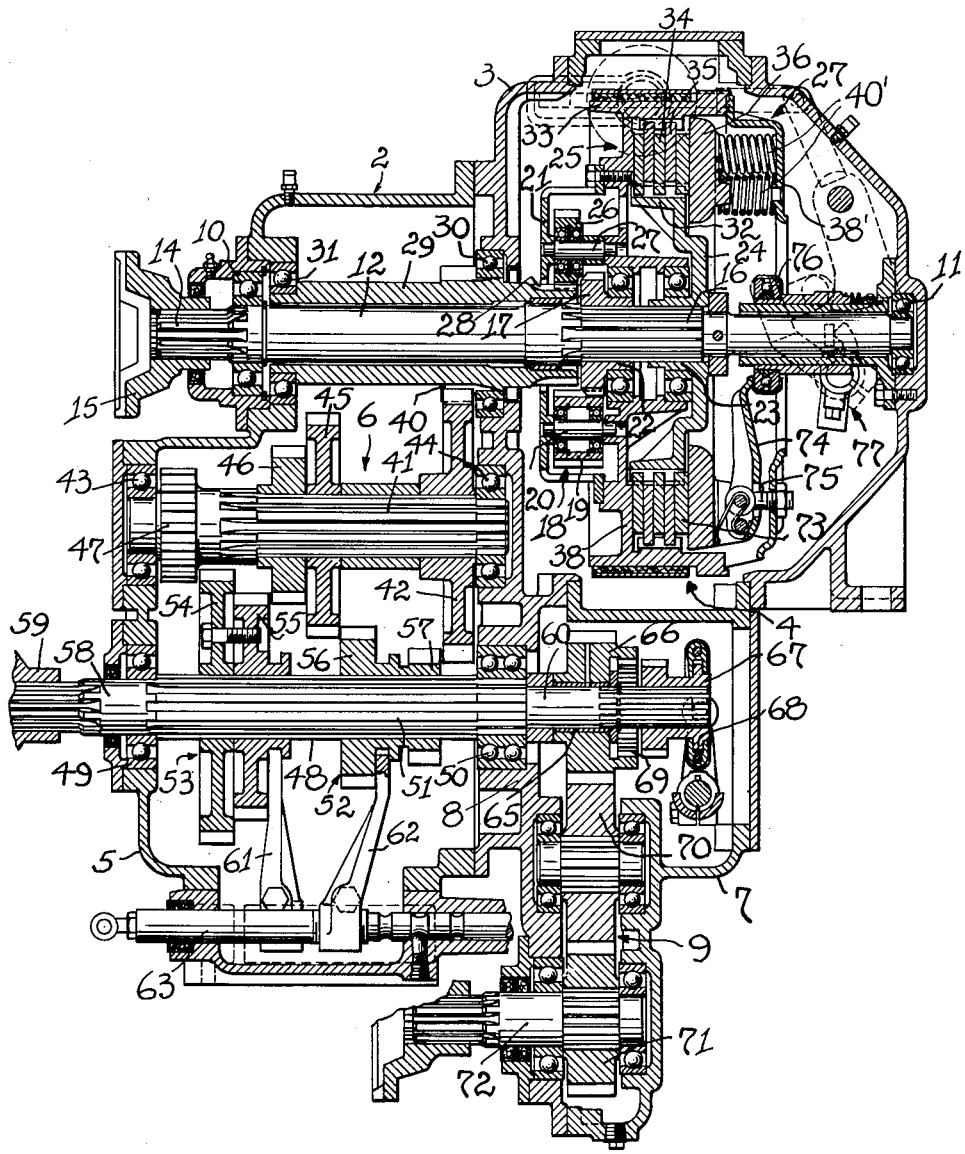
Fig. 2 is a sectional view through the transmission mechanism shown in Fig. 1, the section being taken on line 2—2 of said figure.

Referring now more in detail to the exemplified form of the invention shown in the drawings, numeral 2 denotes a composite gear housing embodying a housing portion 3 mounting a reversing planetary transmission mechanism 4, a housing portion 5 mounting a shiftable multi-speed transmission 6 which is coupled with the planetary transmission mechanism 4, and a housing portion 7 extended from side wall 8 of housing portion 5 and mounting gearing 9 coupled with multi-speed transmission 6.

Housing portion 3 rotatably supports in ball bearings 10 and 11 an input shaft 12 extended from housing 2 and mounting on extended shaft portion 14, a coupling member 15 adapted to couple the input shaft with an engine or motor. Input shaft 12 is directly coupled with the reversing planetary transmission 4 by mounting on a splined portion 16 of such shaft the sun gear 17 of the drive structure 18 of the planetary transmission. This sun gear meshes with planet gears 19 journaled on shafts 20 supported by a planet gear carrier 21 which is freely rotatably mounted on a cylindrical hub 22 of sun gear 17 and a hub 23 on the body portion 24 of the spring-loaded clutch structure 25 of planetary transmission 4. The planet gears 19 mesh with idler planet gears 26 journaled on shafts 27 also mounted on planet gear carrier 21, which idler planet gears mesh with a gear 28 formed as an integral part of a tubular shaft 29 which forms one of the elements of the reversing planetary transmission, and has input shaft 12 axially extended therethrough and is rotatably supported in ball bearings 30, 31.

Spring-loaded clutch structure 25, which is directly coupled with the drive structure 18 of the reversing planetary transmission, has its body portion 24 mounted on the splined portion 16 of input shaft 12 and includes a splined circumferential flange 32 encircled in radially spaced relation by an internally splined, laterally extended flange 33 on planet gear carrier 21. The flanges 32 and 33 non-rotatably and laterally shiftably support cooperating sets of friction disks 34 and 35 arranged to frictionally engage each other when shifted by the yielding force of the ring-shaped, spring-pressed clamping plate member 36 of a clamping plate structure 37 toward radial wall 38 of planet gear carrier 21, which wall forms the backing plate of the clutch structure. Clamping plate structure 37 includes a cover member 38' which is secured to the flange of the planet gear carrier 21 and mounts preloaded springs 40' arranged to yieldingly force the ring-shaped clamping plate member 36 toward radial wall 38.

Tubular shaft 29 is directly geared by a gear 40 formed as an integral part of such shaft to the countershaft 41 of multi-speed transmission 6, gear 40 meshing with a large gear 42 on such countershaft which is journaled in ball bearings 43, 44, mounts two other gears 45 and 46 and includes at its one end portion a pinion 47. The arrangement of gears 42, 45, 46 and pinion 47 on countershaft 41 permits selective coupling of this shaft with a shaft 48 at four different speeds. Shaft 48, which is the main output shaft of the four-speed forward and reverse reduction transmission described herein, is mounted in ball bearings 49, 50 and shiftably and non-rotatably supports on splined portion 51 two double gears 52 and 53, double gear 52 including a large gear 54 and a smaller gear 55 and double gear 53 including a larger gear 56 and a smaller gear 57. In addition shaft 48 extends with its one end portion 58 outside of gear housing 2 and has mounted on such extended end portion a coupling member 59 and extends with its other end portion 60 into the housing portion 7 for a purpose hereinafter to be described. The double gears 52, 53 are shifted by fork members 61 and 62 which are mounted on shiftable operating shafts 63, 64 actuated in any suitable standard manner. End portion 60 of shaft 48 freely rotatably supports on bushing 65 a gear 66 and slidably and non-rotatably mounts on end portion 58 of such shaft a clutch member 67, the clutch teeth 68 of which cooperate with clutch teeth 69 on gear 66 to non-rotatably couple same with shaft 48 when clutch member 67 is shifted toward gear 66.

The gear 66 meshes with an idler gear 70 which meshes with a gear 71 splined to a shaft 72 journaled in housing portion 7, which shaft 72 is arranged parallel to output shaft 48 and extended outside of housing portion 7 to provide a selectively operable additional output shaft for the transmission. A release of spring-loaded clutch structure 25 is effected by withdrawing the ring-shaped clamping plate 36 from engagement with ring-shaped plate 73 contacting the friction disk 35. For such purpose clutch structure 25 includes a number of fingers 74 pivoting about studs 75 in cover member 38' and backing plate 36 away from plate 73 when these fingers are acted upon by a thrust bearing 76 through the instrumentality of outside clutch release means 77 extended into housing portion 3 for coupling connection with thrust bearing 76 and journaled in bearings 78, 79 of such housing portion. Clutch release means 77 are coupled with brake actuating means 80 by a cross shaft 81 which is journaled in bearings 82 and 83 and coupled with the clutch release means by lever and cam lever means 84 and coupled by a lever 85 with a brake wedge 86 adapted to effect tensioning of brake band 87 around the laterally extended flange 33 of planet gear carrier 21. Brake band 87 is normally shifted out of clamping engagement with flange 33 by springs 88, 89 attached to the V-shaped ends 90, 91 of the brake band and the gear housing 2. The V-shaped end 90 of this brake band is arrested by a brake anchor 92 which includes in a housing 93 an axially adjustably supported brake stop 94 backed up by an adjustable set screw 95. Brake anchor 92 pivotally supports one end of a brake link 96 engaging with its other end V-shaped end 90 of the brake band, the V-shaped end 91 of which is engaged by a brake link 97 pivoted to brake operating plunger 98 shiftably mounted in brake wedge housing 99. Plunger 98 mounts in its slotted end a roller 100 which cooperates with a back-up roller 101 in slotted adjusting screw member 102 and brake wedge 86 in effecting gripping of planet gear carrier 21 by brake band 87.

Figure 3:
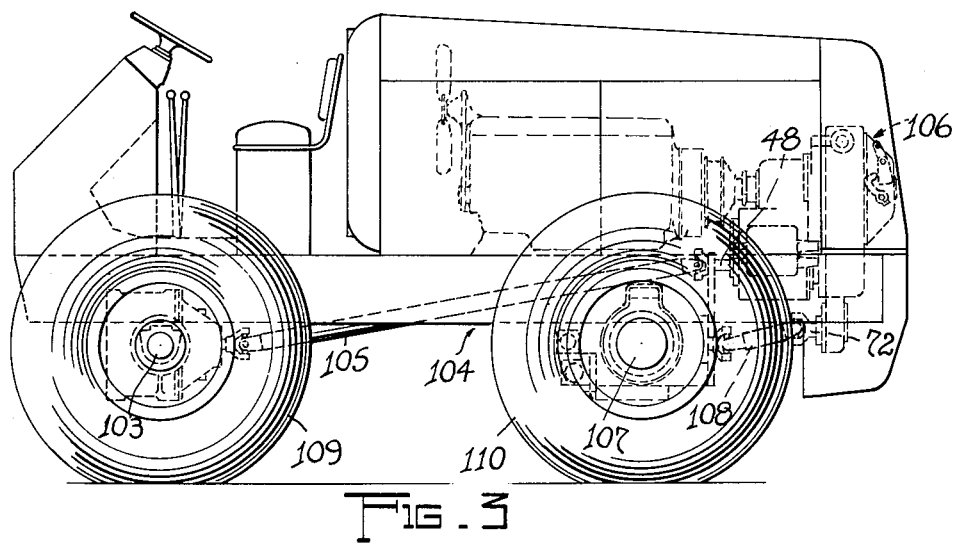
Fig. 3 is a side view of a tractor with a transmission formed by a reversing multi-speed reduction transmission mechanism of the type disclosed herein.
Figure 4:
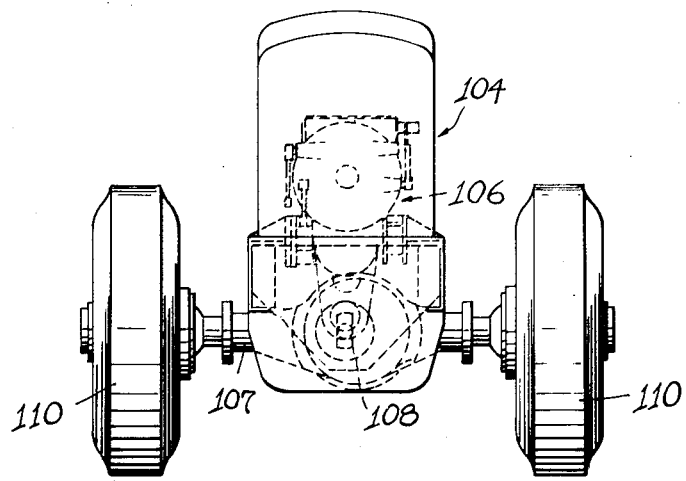
Fig. 4 is a rear view of the tractor shown in Fig. 3.

The described transmission may be used as transmission for tractors as disclosed in Figs. 3 and 4 in which the front or main drive axle 103 of tractor 104 is coupled by the front axle drive shaft 105 with the main output shaft 48 of transmission 106 and in which the rear axle 107 of said tractor is coupled by rear axle drive shaft 108 with the subsidiary output shaft 72 of the transmission to permit selective propelling of tractor 104 either by two or four wheels depending on the active or inactive positioning of clutch member 67. In the example shown tractor 104 embodies equally dimensioned front and rear wheels 109 and 110, which construction necessitates rotation of the primary and secondary output shafts 58 and 72 at the same speed ratio. However, the described transmission may readily be used with tractors embodying differently dimensioned front and rear wheels by changing the speed ratio between primary and secondary output shafts accordingly.

Actuation of the described four-speed forward and reverse reduction transmission is effected when clutch structure 27 of reversing planetary transmission 4 is activated by preloaded springs 40' to directly transfer rotation of input shaft 12 to tubular shaft 29 by sun gear 17, idler planet gears 26 and planet gears 19, as in this case the planet and idler planet gears are interlocked with each other due to coupling of planet gear carrier 21 with the main body portion of clutch structure 25, under which conditions input shaft 12 and tubular shaft 29 are coupled for direct rotation in the same direction at the same speed. When clutch structure 25 is inactivated as previously described, rotation of input shaft 12 is transferred to tubular shaft 29 through sun gear 17, idler planet gears 26 and planet gears 19. In this case rotation of tubular shaft 29 is resisted whereas rotation of planet gear carrier 21 is unimpeded so that planet gears 19 effect idling of planet gear carrier 21 around tubular shaft 29. When clutch structure 25 is inactivated as previously described, rotation of input shaft 12 is transferred to tubular shaft 29 through sun gear 17, idler planet gears 26 and planet gears 19 so that shaft 29 is rotated in a direction reverse to the direction of rotation of input shaft 12.

Tubular shaft 29 when thus rotated in a forward or reverse direction drives countershaft 41 by gear 40 and gear 42, and this countershaft drives at the selected speed of multi-speed transmission 6 output shafts 48 and 72 by the respective gears 42, 45, 46 and pinion 47 when coupled with shiftable double gears 52, 53, respectively, the output shafts 48 and 72 being releasably coupled with each other by clutch-controlled gear 66, idler gear 70 and gear 71.

Having thus described my invention:
What I claim is:

1. In a power drive transmission comprising a reversing planetary-type gearing and a change speed gearing, an input shaft directly coupled with the planetary-type gearing, a countershaft geared to said planetary-type gearing including driving gears of different sizes rigidly mounted on said countershaft, a primary output shaft arranged parallel to said countershaft including driven gears shiftably and non-rotatably carried by said output shaft to be selectively meshed with the driving gears on said countershaft, a secondary output shaft arranged parallel to said primary output shaft, and clutch-controlled gearing coupling said secondary output shaft with said primary output shaft, said clutch-controlled gearing including a gear freely rotatably mounted on said primary output shaft and a releasable clutch coupling such gear with the primary output shaft, whereby by selective engagement and disengagement of the releasable clutch said gear may be directly driven by the primary output shaft and impart selective rotation to the secondary output shaft.

2. A power drive transmission as described in claim 1, wherein the clutch-controlled gearing coupling the primary output shaft with the secondary output shaft effects rotation of the two output shafts in the same direction.

3. A power drive transmission as described in claim 1, wherein the clutch-controlled gearing coupling the primary output shaft with the secondary output shaft effects rotation of the two output shafts in the same direction and at the same speed ratio.

4. A power drive transmission as described in claim 1, wherein the primary output shaft and the secondary output shaft are arranged above each other, and wherein the input shaft, the primary output shaft and the secondary output shaft are arranged parallel to each other and extended from the transmission in the same direction.

5. A power drive transmission as described in claim 1, including a chambered housing with a first chamber for the planetary-type gearing, a second chamber for the change speed gearing having the input shaft extended therethrough into the first chamber and having the coupling connection of the planetary-type gearing and change speed gearing arranged therein, and a third chamber for the clutch-controlled gearing having the secondary output shaft journaled therein, the third chamber being arranged below the first chamber and adjacent to the second chamber to extend the primary output shaft through the second chamber into the third chamber and the secondary output shaft out of said third chamber below the second chamber.

6. In a power drive transmission, a housing mounting an input shaft, reversing planetary-type gearing coupled therewith, change speed gearing coupled with the reversing planetary-type gearing, and two output shafts geared to each other and the change speed gearing, the input shaft and the two output shafts being arranged parallel to each other and all said shafts being extended from the transmission through the same wall portion of its housing.

7. In a tractor comprising an engine and front and rear axles, a reversing driving transmission including a housing mounted on the rear of said tractor behind the rear axle thereof, an input shaft coupled with the engine, a primary output shaft coupled by a drive shaft with one of said axles and a clutch-controlled secondary output shaft driven by said primary output shaft and coupled with the other one of said axles for selective joint and individual actuation of the front and rear axles of the tractor, the input shaft and the primary and secondary output shafts of said transmission being extended therefrom through the same wall portion of its housing.

References Cited in the file of this patent
UNITED STATES PATENTS

| | | |
|---|---|---|
| 2,158,320 | Bock | May 16, 1939 |
| 2,431,727 | Bennett | Dec. 2, 1947 |
| 2,557,324 | Tomlinson | June 19, 1951 |